(12) United States Patent
Culler et al.

(10) Patent No.: US 6,909,586 B2
(45) Date of Patent: Jun. 21, 2005

(54) CIRCUIT BREAKER VOLTAGE SENSING MODULE

(75) Inventors: Mark Fredrick Culler, Kensington, CT (US); James Robert Scanlon, South Windsor, CT (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/063,097

(22) Filed: Mar. 19, 2002

(65) Prior Publication Data

US 2003/0179526 A1 Sep. 25, 2003

(51) Int. Cl.[7] .............................. H02H 3/08; H02J 1/00
(52) U.S. Cl. ...................... 361/93.2; 361/94; 335/172; 307/38
(58) Field of Search .................... 361/90, 93, 93.2, 361/93.4, 93.3, 93.6, 94, 93.1, 93.5, 96, 97, 73, 74; 307/38, 19, 23, 129; 335/172, 16; 364/483, 484; 324/142

(56) References Cited

U.S. PATENT DOCUMENTS

| | | | |
|---|---|---|---|
| 4,331,999 A | | 5/1982 | Engel et al. |
| 5,136,236 A | | 8/1992 | Bohnert et al. |
| 5,420,799 A | * | 5/1995 | Peterson et al. ............... 702/62 |
| 5,600,527 A | * | 2/1997 | Engel et al. ................ 361/93.2 |
| 5,804,953 A | * | 9/1998 | Bowyer et al. ............. 323/256 |
| 5,936,817 A | * | 8/1999 | Matsko et al. ................ 361/72 |
| 6,094,330 A | | 7/2000 | Criniti et al. |
| 6,191,697 B1 | | 2/2001 | Hansen et al. |
| 6,426,634 B1 | * | 7/2002 | Clunn et al. ................ 324/536 |

* cited by examiner

*Primary Examiner*—Rajnikant B. Patel
(74) *Attorney, Agent, or Firm*—Cantor Colburn LLP

(57) ABSTRACT

A combined current and voltage sensor includes: a combined sensor shell; a current sensor located in the combined sensor shell, the current sensor disposed proximate to said first load strap; and a first voltage sensor located in the combined sensor shell, the first voltage sensor disposed proximate to the first load strap. A circuit breaker includes: a first load strap in electrical communication with an electronic trip unit; a breaker in electrical communication with the electronic trip unit; a current sensor disposed at the first load strap; and a first voltage sensor disposed proximate the current sensor.

30 Claims, 6 Drawing Sheets

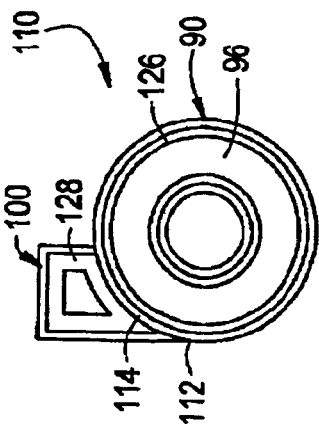
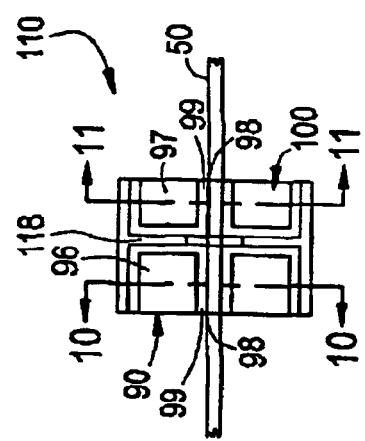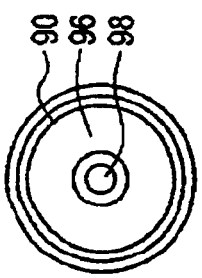
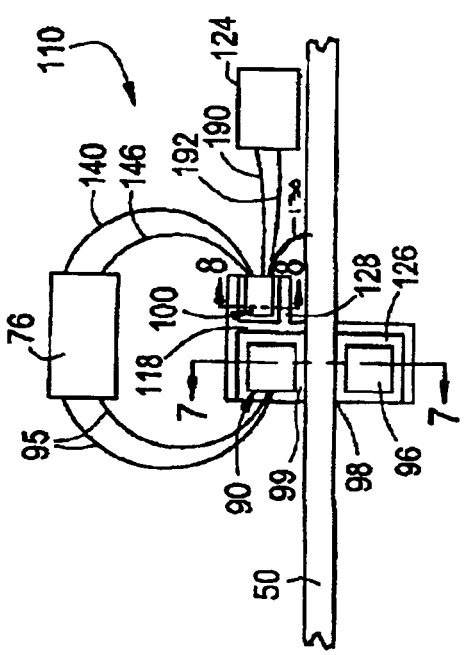

CIRCUIT BREAKER VOLTAGE SENSING MODULE

BACKGROUND OF INVENTION

Circuit breakers are used to protect equipment from overcurrent situations caused, for example, by short circuits or ground faults in or near such equipment. In the event an overcurrent condition occurs, electrical contacts within the circuit breaker will open, stopping the flow of electrical current through the circuit breaker to the equipment.

Circuit breakers may include an electronic trip unit that senses electrical current to the protected equipment. If the sensed electrical current indicates an overcurrent situation, the electronic trip unit provides a trip signal to a trip actuator (e.g., a solenoid). In response to the trip signal, the trip actuator actuates (trips) a mechanical operating mechanism. Actuation of the mechanical operating mechanism by the trip actuator causes the mechanical operating mechanism to separate (i.e., open) the electrical contacts, stopping the flow of current to the protected equipment.

In addition to sensing current to the protected equipment, the electronic trip unit may also sense the voltage across the protected equipment. The sensed current and voltage can be used for the purpose of metering quantities including voltage, current, power, energy, and power factor. The traditional method of sensing voltage is to employ potential transformers and a voltage divider to reduce the system voltage to a low level for input to the electronics. Because of space constraints in the circuit breakers, these components are typically mounted external to the circuit breaker housing. Wiring is then run from the output of the voltage divider networks to each circuit breaker. Where a large number of circuit breakers are installed, the wiring needed to accommodate the externally-mounted voltage sensing equipment consumes spaces and increases installation cost.

SUMMARY OF INVENTION

The above discussed and other drawbacks and deficiencies are overcome or alleviated by a combined current and voltage sensor in a circuit breaker. In an exemplary embodiment of the invention, the combined current and voltage sensor includes a combined sensor shell; a current sensor located in the combined sensor shell, the current sensor disposed proximate to the first load strap; and a first voltage sensor located in the combined sensor shell, the first voltage sensor disposed proximate to the first load strap. A circuit breaker includes: a first load strap in electrical communication with an electronic trip unit; a breaker in electrical communication with the electronic trip unit; a current sensor disposed at the first load strap; and a first voltage sensor disposed proximate the current sensor. In addition, the circuit breaker may be any type of circuit breaker including a molded case or insulated case circuit breaker and an open frame or air circuit breaker.

The above discussed and other features and additional advantages of the present invention will be appreciated and understood by those skilled in the art from the detailed description and drawing.

BRIEF DESCRIPTION OF DRAWINGS

Referring to the exemplary drawings wherein like elements are number alike in the several Figures:

FIG. 6 is a cross-sectional view of a combined current sensor and voltage sensor having a back-to-back configuration;

FIG. 7 is cross-sectional view of the combined current sensor and voltage sensor taken along section 7—7 of FIG. 6;

FIG. 8 is cross-sectional view of the combined current sensor and voltage sensor taken along section 8—8 of FIG. 6;

FIG. 9 is a cross-sectional view of an alternative embodiment of a combined current sensor and a voltage sensor with both current sensor and voltage sensor having a toroidal shape having a back-to-back configuration;

FIG. 10 is a cross-sectional view of the combined current sensor and voltage sensor taken along section 10—10 of FIG. 9;

FIG. 11 is a cross-sectional view of the combined current sensor and voltage sensor taken along section 11—11 of FIG. 9; and FIG. 12 is a cross-sectional view an alternative embodiment of a combined current sensor and voltage sensor having a side-by-side configuration.

DETAILED DESCRIPTION

Figure 1:
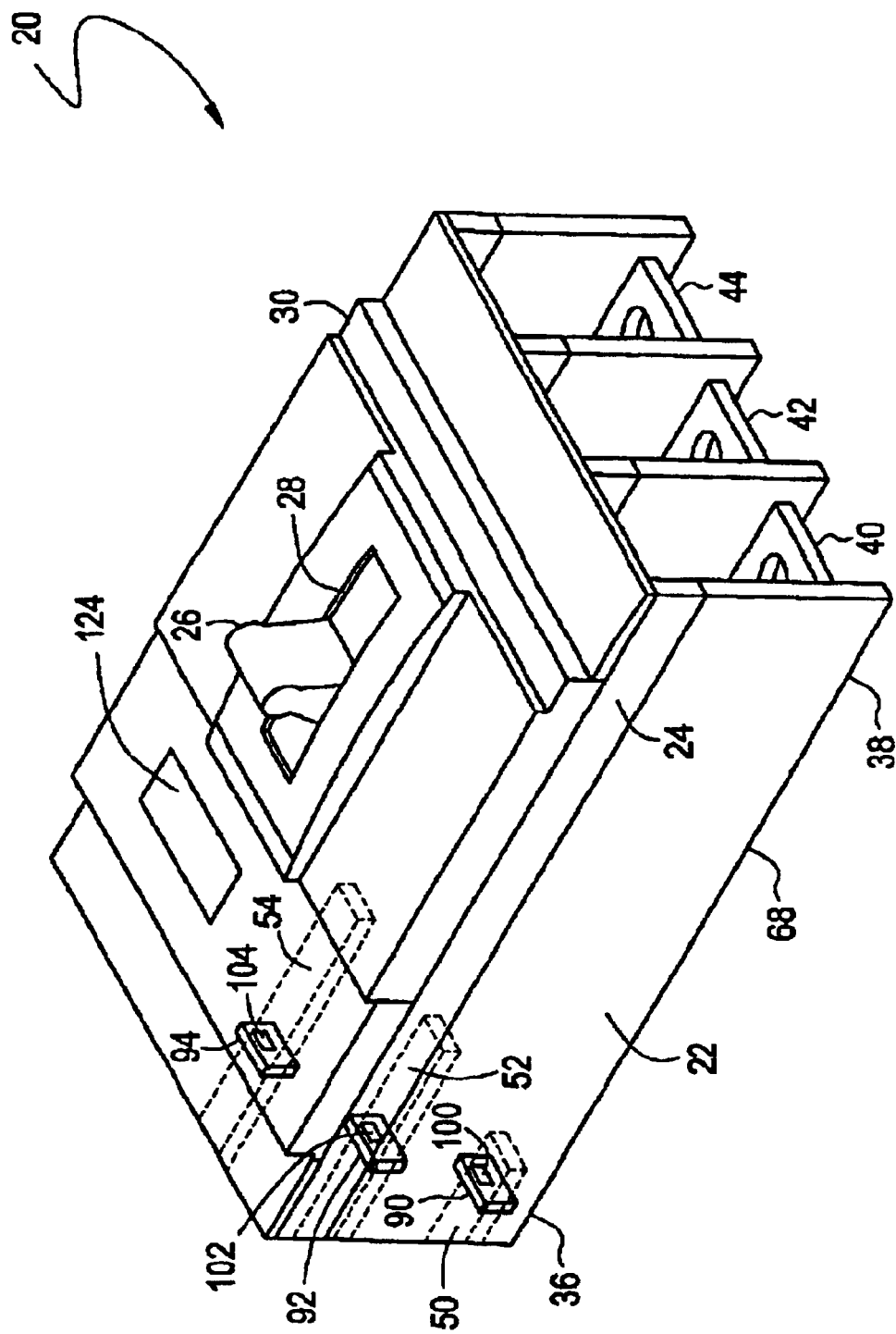
FIG. 1 is a perspective view of a circuit breaker including a voltage sensor.

Referring to FIG. 1, an embodiment of a molded case circuit breaker 20 is generally shown. Circuit breakers of this type have an insulated case 22 and a mid-cover 24 that house the components of circuit breaker 20. A handle 26 extending through an aperture 28 of a cover 30 gives the operator the ability to turn circuit breaker 20 "on", which allows electricity to flow through circuit breaker 20, turn circuit breaker 20 "off", which prevents electricity from flowing through circuit breaker 20, or "reset" circuit breaker 20 after a fault. A plurality of electrically conducting line-side contact straps (line straps) 40, 42, and 44 and load side contact straps (load straps) 50, 52, and 54 extend within case 22 for connecting the line and load conductors of circuit breaker 20. Load straps 50, 52, and 54 are located at load side 36 of circuit breaker 20. Line straps 40, 42, and 44 are located at line side 38 of circuit breaker 20. Circuit breaker 20 illustrates a typical three-phase configuration, however, the present disclosure is not limited to this configuration but may be applied to other configurations, such as one, two or four pole circuit breakers. Removably disposed at cover 30 is a configuration plug 124, as will be described in further detail hereinafter.

Figure 2:
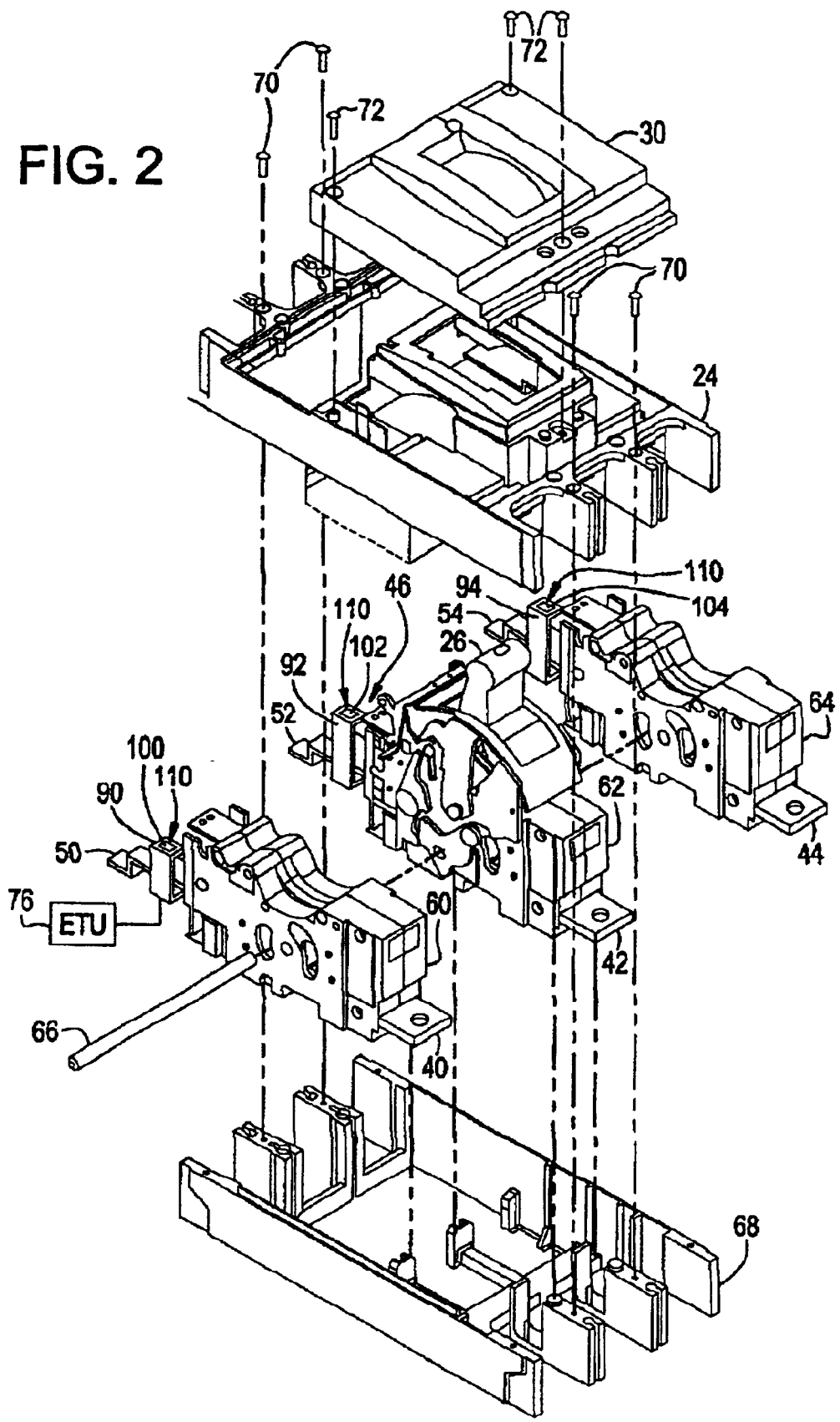
FIG. 2 is an exploded perspective view of the circuit breaker of FIG. 1.

Referring to FIGS. 1 and 2, handle 26 is attached to a circuit breaker operating mechanism 46. Circuit breaker operating mechanism 46 is coupled with an electrically insulative center cassette (cassette) 62 and is connected with electrically insulative outer cassettes (cassette) 60 and 64 by a drive pin 66. Cassettes 60, 62 and 64 along with the circuit breaker operating mechanism 46 are assembled into a base 68 and retained therein by the mid-cover 24. Mid-cover 24 connects to base 68 by any convenient means, such as screws 70, snap-fit (not shown) or adhesive bonding (not shown). Cover 30 is attached to mid-cover 24 by screws 72 or the like. It should be noted that while circuit breaker 20 is illustrated with cassettes, this is only one particular embodiment for circuit breaker 20 and other types of circuit breakers are contemplated.

Load straps 50, 52, and 54 conduct current and voltage from a power source (not shown) through circuit breaker 20. Disposed around load straps 50, 52, and 54 are current sensors 90, 92, and 94 that provide operating power and input current signals to an electronic trip unit 76. In addition, voltage sensors 100, 102, and 104 are located proximate to current sensors 90, 92, and 94 and may be disposed around load straps 50, 52, and 54. Voltage sensor 100 and current sensor 90 are housed in a combined sensor shell 110, as will be described in further detail hereinafter.

Figure 3:
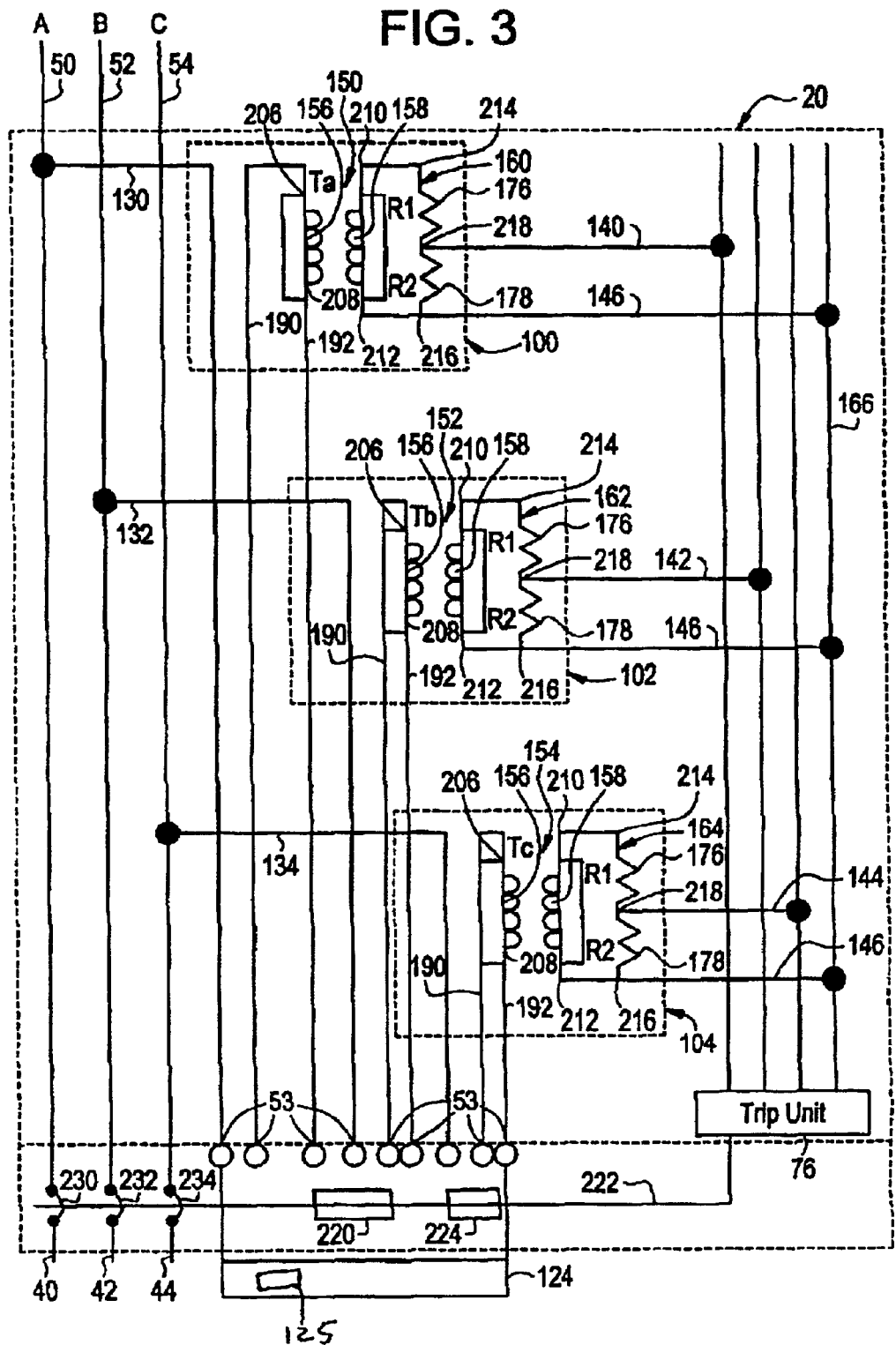
FIG. 3 is a schematic block diagram of an exemplary embodiment of the voltage sensor in the circuit breaker of FIG. 1.

Referring to FIG. 3, a general schematic of a portion of circuit breaker 20 is shown. In circuit breaker 20, load straps 50, 52, and 54 are electrically connected to line straps 40, 42, and 44 via electrical contacts 230, 232, and 234. Electrical contacts are mechanically connected to an operating mechanism 220. A trip actuator 224 is positioned to trip operating mechanism 220 in response to receiving an electrical trip signal from electronic trip unit 76 via line 222.

Load straps 50, 52, and 54 are configured for electrical connection to a three-phase power source exemplified by phases A, B, and C. Lines 130, 132, and 134 connect load straps 50, 52, and 54 to terminals 53 of configuration plug 124. In the embodiment shown, the voltage connection from load straps 50, 52, and 54 to voltage sensors 100, 102, and 104 is illustrated. The voltage connection can also occur at configuration plug 124. Voltage sensors 100, 102, and 104 are connected to terminals 53 of configuration plug 124 through lines 190 and 192.

Voltage sensors 100, 102, and 104 include transformers 150, 152, and 154, and voltage dividers 160, 162 and 164, respectively. Transformers 150, 152, and 154 each include a primary winding 156 and a secondary winding 158. In each transformer 150, 152, and 154, primary winding 156 is connected at one end 206 to a terminal 53 of configuration plug 124 via a line 190. The opposite end 208 of primary winding 156 is connected to a terminal 53 of configuration plug 124 via a line 192. Also in each transformer 150, 152, and 154, secondary winding 158 is connected at one end 212 to a ground line 166 via a line 146. The opposite end 210 of secondary winding 158 is connected to a first end of voltage divider 160, 162, or 164.

Voltage dividers 160, 162 and 164 each include a resistor 176 and a resistor 178 connected in series between secondary winding 158 and ground line 166. An end 214 of resistor 176 is connected to end 210 of secondary winding 158, and an end 216 of resistor 178 is connected to ground line 166 via line 146. In voltage sensor 100, the junction of resistors 176 and 178 is connected to electronic trip unit 76 via line 140. In voltage sensor 102, the junction of resistors 176 and 178 is connected to electronic trip unit 76 via line 142, and in voltage sensor 104, the junction of resistors 176 and 178 is connected to electronic trip unit 76 via line 144.

Configuration plug 124 is connected to load straps 50, 52, and 54, and voltage sensors 100, 102, and 104 via terminals 53. Within configuration plug 124, jumpers 186 through 189 (shown in FIGS. 4 and 5) between terminals 53 electrically connect load straps 50, 52, and 54, and voltage sensors 100, 102, and 104 to form either a wye or delta configuration. Configuration plug 124 may be removed and replaced by a user. The user would choose the appropriate configuration plug 124 with either the delta or wye configuration and plug it at circuit breaker 20. Alternatively, configuration plug may be sealed in circuit breaker 20. In that embodiment, configuration plug 124 includes a multiple switch 125 that allows a user to switch configuration plug 124 between the delta or wye configuration.

Figure 4:
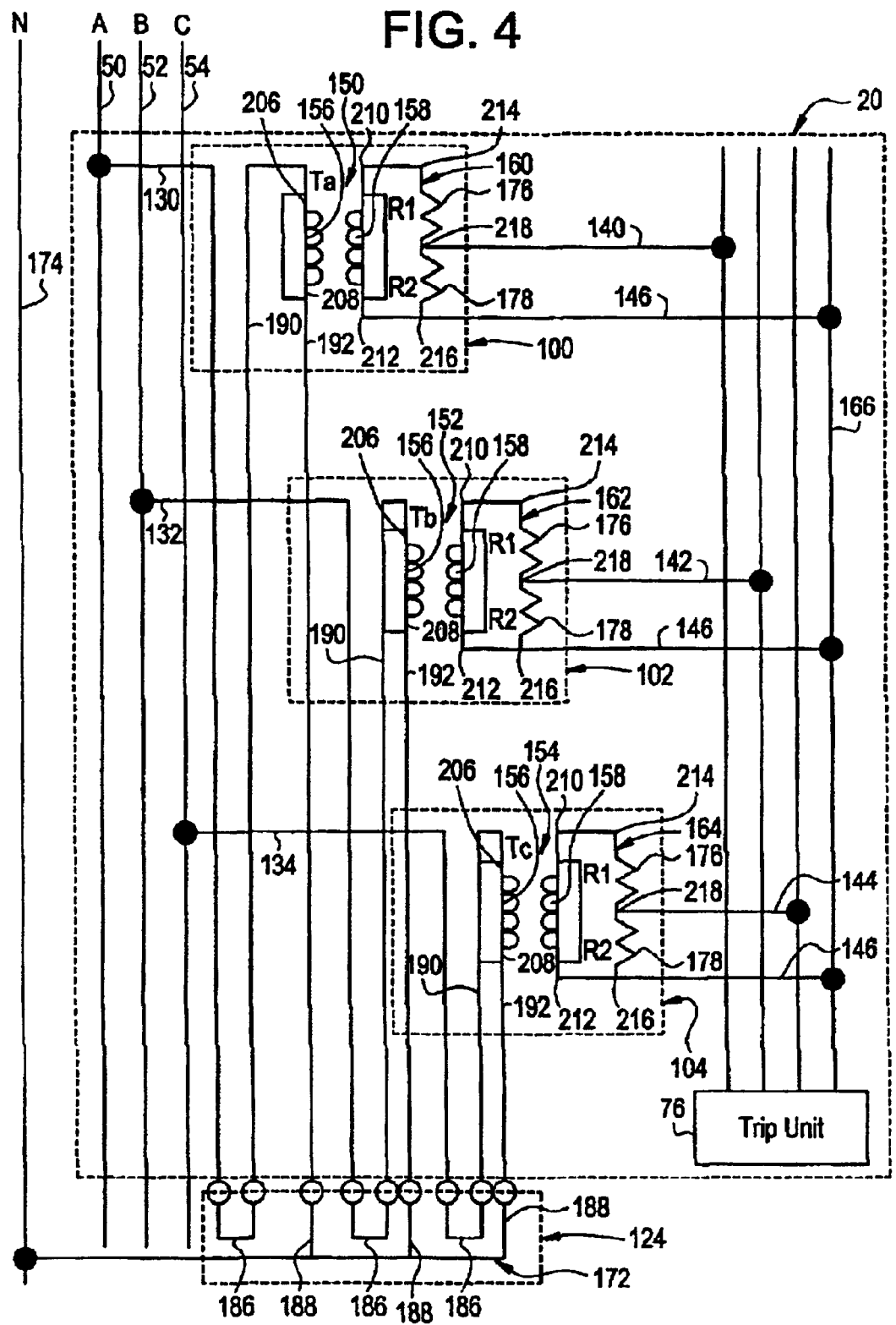
FIG. 4 is a schematic block diagram of the voltage sensor of FIG. 1 including a delta configuration plug; F

Referring to FIG. 4, a configuration plug 124 having a wye configuration 172 is illustrated. In wye configuration 172, a first set of jumpers 186 within configuration plug 124 connect lines 130, 132, and 134 to lines 190 of voltage sensors 100, 102, and 104, respectively. Also in wye configuration 172, a second set of jumpers 188 within configuration plug 124 connect lines 192 of voltage sensors 100, 102, and 104 with a neutral line 174. Line 174 is a neutral or reference point for measuring input voltages.

In operation, load straps 50, 52, and 54 provide input voltages to voltage sensors 100, 102, and 104. Within voltage sensors 100, 102, and 104, transformers 150, 152 and 154 reduce the voltage and provide output voltages to voltage dividers 160, 162, and 164. Voltage dividers 160, 162 and 164 further reduce the output voltages before they reach electronic trip unit 76. Electronic trip unit 76 senses the output voltages from voltage dividers 160, 162 and 164 for metering or protection purposes.

Figure 5:
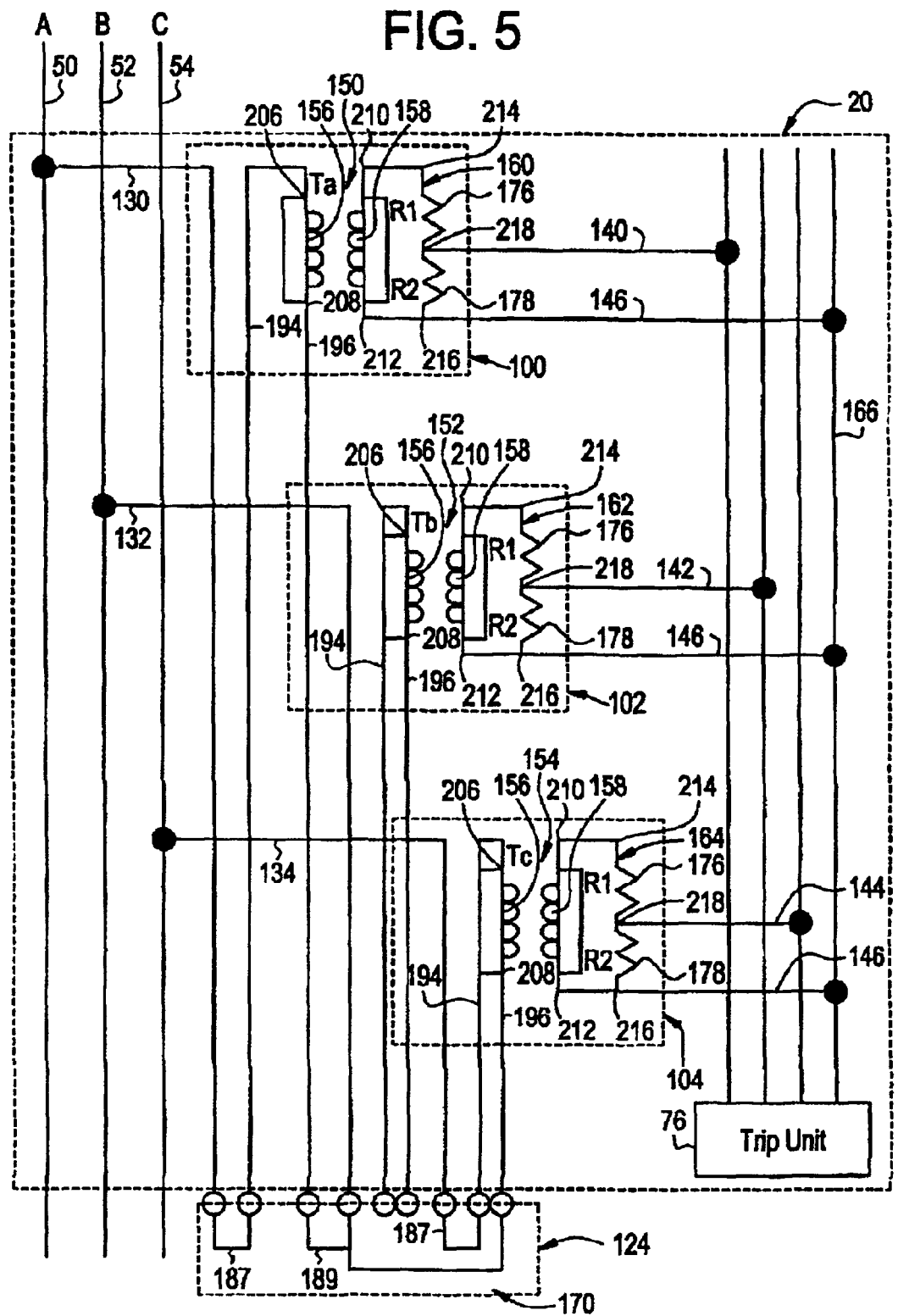
FIG. 5 is a schematic block diagram alternative embodiment of the voltage sensor of FIG. 1 including a wye configuration plug.

Referring to FIG. 5, a configuration plug 124 having a delta configuration 170 is illustrated. In delta configuration 170, load strap 52 (phase B) is used as the reference point to measure input voltages. A configuration plug 124 having a delta configuration 170 is used, for example, where a neutral line is not available. In configuration plug 124, set of jumpers 187 connects lines 130 and 134 with lines 194 of voltage sensors 100 and 104, respectively. Another set of jumpers 189 in configuration plug 124 connects lines 196 of voltage sensors 100 and 104 with line 132 of voltage sensor 102. Lines 194 and 196 of voltage sensor 102 are open circuited. Thus, input voltages for phase A and C are measured relative to the input voltage for phase B and there is no measurement for phase B.

In operation, load straps 50, 52, and 54 provide input voltages to voltage sensors 100, and 104. Within voltage sensors 100 and 104, transformers 150 and 154 reduce the voltage and provide output voltages to voltage dividers 160 and 164. Voltage dividers 160 and 164 further reduce the output voltages before they reach electronic trip unit 76. Electronic trip unit 76 senses the output voltages from voltage dividers 160 and 164 for metering or protection purposes.

Referring to FIGS. 4 and 5, it will be recognized that voltage dividers 160, 162, and 164 may be eliminated and voltage sensors 100, 102, and 104 may comprise only transformers 150, 152, and 154. Alternatively, transformers 150, 152, and 154 may be eliminated and only voltage dividers 160, 162, and 164 may be employed. However, the use of both transformers 150, 152, and 154 and voltage dividers 160, 162, and 164 are preferred because transformers 150, 152, and 154 isolate the input voltages from electronic trip unit 76. Moreover, the use of both transformers 150, 152, and 154 and voltage dividers 160, 162, and 164 provide flexibility in choosing appropriate transformers and voltage dividers for voltage sensors 100, 102, and 104.

Referring to FIG. 6, combined sensor shell 110 houses current sensor 90 and voltage sensor 100 in which current sensor 90 and voltage sensor 100 have a back-to-back configuration. Similar combined sensor shells 110 are also used for housing current sensor 92 and voltage sensor 102, and current sensor 94 and voltage sensor 104. Combined sensor shell 110 is made of a molded, insulative material such as plastic.

Combined sensor shell 110 comprises a current sensor cavity 126 and a voltage sensor cavity 128. Current sensor 90 includes a core 96, which is shaped as a toroid, a rectangle, or the like. Disposed around core is a secondary winding (not shown), which provides a signal via lines 95 to trip unit 76. Current sensor 90 is located within current sensor cavity 126. An aperture 98 extends through combined sensor shell 110 and is aligned with an aperture 99 in core 96. Aperture 98 allows load strap 50 to pass through core 96, forming the primary winding for current sensor 90.

Voltage sensor cavity 128 extends from an end 118 of current sensor cavity 126 and is adjacent to load strap 50. Voltage sensor 100 is located within voltage sensor cavity 128. Voltage sensor 100 is illustrated as a having a rectangular shape, however, it may comprise any shape. Voltage sensor 100 is connected to load strap 50 via line 130. Voltage sensor 100 is also connected to configuration plug 124 via lines 130, 190, and 192.

FIG. 7 depicts a cross-sectional view of current sensor 90 taken along section 7—7 of FIG. 6. In this embodiment, core 96 is depicted as toroidally shaped, with aperture 98 in the center of core 96. FIG. 8 depicts a cross-sectional view voltage sensor 100 taken along section 8—8 of FIG. 6.

FIGS. 9 and 12 provide alternative embodiments of combined sensor shell 110. In both FIGS. 9 and 12, current sensor 90 and voltage sensor 100 are located in combined sensor shell 110. FIG. 9 illustrates voltage sensor 100 as a transformer having a toroidal core, similar to current sensor 90. In this embodiment, current sensor 90 includes a core 96, which is shaped toroidally. Core 96 is located within current sensor cavity 126. Aperture 98 extends through combined sensor shell 110 and is aligned with an aperture 99 in core 96 and an aperture 99 in a core 97 of voltage sensor 100. Aperture 98 allows load strap 50 to travel through cores 96 and 97, forming the primary winding for cores 96 and 97. Voltage sensor cavity 128 is located at an end 118 of current sensor cavity 126. Secondary windings (not shown) are disposed about cores 96 and 97 to provide signals to trip unit 76 (FIG. 6) indicative of current and voltage in load strap 50.

FIG. 10 depicts a cross-sectional view of current sensor 90 taken along section 10—10 of FIG. 9. FIG. 11 depicts a cross-sectional view voltage sensor 100 taken along section 11—11 of FIG. 9.

FIG. 12 illustrates voltage sensor 100 as having a rectangular shape and being located on a side 114 of current sensor. Side 114 is a side of current sensor 90 in which load strap 50 does not pass through. FIG. 12 illustrates combined sensor shell 110, which comprises a current sensor cavity 126 and a voltage sensor cavity 128. In this embodiment, voltage sensor 100 is located within voltage sensor cavity 128, which is located on a side 114 of current sensor 90. The connections for voltage sensor 100 and current sensor 90 are the same as shown in FIG. 6 and are not shown in this embodiment.

Referring to FIGS. 1–9, voltage sensors 100, 102, and 104 are each installed in a combined sensor shell 110 along with current sensors 90, 92, and 94, respectively. Load straps 50, 52 and 54 are each disposed through one combined sensor shell 110, and the load straps 50, 52, and 54 and combined sensor shells 110 are then placed in the insulated case 22 of circuit breaker 20. Because voltage sensors 100, 102, and 104 are combined with current sensors 90, 92, and 94 in combined sensor shell 110, the voltage sensors and current sensors can be installed conveniently and economically into circuit breaker 20. In addition, combined sensor shell 110 allows voltage sensors 100, 102, and 104 to fit within unused space within circuit breaker 20. As a result, there is no need for external transformers, wiring, or other equipment as would be required with externally mounted voltage sensors of the prior art.

Moreover, the configuration plug 124 allows the circuit breaker 20 to be easily configured for applications with or without a neutral wire. Configuration plug 124 having a wye configuration allows the circuit breaker 20 to be employed when there is a neutral wire available, and a configuration plug 124 having a delta configuration allows the circuit breaker 20 to be employed when there is no neutral wire. The configuration plug 124 can be changed without opening the cover 24 of the circuit breaker.

While this invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but rather that the invention will include all embodiments falling within the scope of the appended claims.

What is claimed is:

1. A combined current and voltage sensor for sensing current and voltage in a first load strap of one phase of a circuit breaker having a housing the combined current and voltage sensor comprising:
    a combined sensor shell;
    a current sensor located in said combined sensor shell, said current sensor disposed proximate to said first load strap; and
    a first voltage sensor located in maid combined sensor shell, said first voltage sensor disposed proximate to said first load strap;
    said current sensor and said voltage sensor of said combined sensor shell disposed in signal communication with only one phase of the circuit breaker; and
    said combined sensor shell placeable within the circuit breaker housing.

2. The combined current and voltage sensor of claim 1, further comprising an electronic trip unit disposed in said circuit breaker and in electrical communication with said first voltage sensor.

3. The combined current and voltage sensor of claim 1, wherein said first voltage sensor includes a transformer.

4. The combined current and voltage sensor of claim 1, wherein said first voltage sensor includes a voltage divider.

5. The combined current and voltage sensor of claim 4, wherein said voltage divider includes a first resistor in series with a second resistor.

6. The combined current and voltage sensor of claim 1, wherein said combined sensor shell is molded plastic.

7. A circuit breaker having an electronic trip unit and a plurality of phases, the circuit breaker comprising:
    a housing;
    a first load strap of one of the plurality of phases in electrical communication with the electronic trip unit;
    a current sensor disposed at said first load strap; and
    a first voltage sensor disposed proximate said current sensor;

wherein said current sensor and said first voltage sensor are housed in a combined sensor shell and are in signal communication with only the one of the plurality of phases, said combined sensor shell disposed within said circuit breaker housing.

8. The circuit breaker of claim 7, further comprising a second voltage sensor disposed proximate to a second load strap of a second phase of the plurality of phases and a third voltage sensor disposed proximate to a third load strap of a third phase of the plurality of phases.

9. The circuit breaker of claim 8, further comprising a detachable configuration plug in electrical communication with said first voltage sensor, said second voltage sensor, and said third voltage sensor.

10. The circuit breaker of claim 9, wherein said configuration plug is in direct electrical connection with said voltage sensors, and said voltage seniors are in direct electrical connection with said load straps.

11. The circuit breaker of claim 9, wherein said configuration plug is in direct electrical connection between said load straps and said voltage sensors.

12. The circuit breaker of claim 9, wherein said configuration plug is operable to configure maid first voltage sensor, said second voltage sensor, and said third voltage sensor in a wye configuration with said first load strap, said second load strap, said third load strap, and a neutral line.

13. The circuit breaker of claim 9, wherein said configuration plug is operable to configure said first voltage sensor, said second voltage sensor, and said third voltage sensor in a delta configuration with said first load strap, said second load strap, said third load strap.

14. The circuit breaker of claim 7, wherein said first voltage sensor includes a transformer.

15. The circuit breaker of claim 7, wherein said first voltage sensor includes a voltage divider.

16. The circuit breaker of claim 15, wherein said voltage divider includes a first resistor in series with a second resistor.

17. A multiphase circuit breaker having an electronic trip unit, the circuit breaker comprising:
a first, a second, and a third load strap of a first, a second, and a third phase, each load strap in electrical communication with the electronic trip unit;
a first voltage sensor disposed at said first load strap;
a second voltage sensor disposed at said second load strap;
a third voltage sensor disposed at said third load strap; and
a detachable configuration plug in electrical communication with said first, said second, and said third voltage sensor;
wherein said configuration plug is operable to configure said first, said second, and said third voltage sensor in a wye configuration and/or a delta configuration with respect to said first, said second, and said third load strap.

18. The circuit breaker of claim 17, wherein said configuration plug is in direct electrical connection with said voltage sensors and said voltage sensors are in direct electrical connection with said load straps.

19. The circuit breaker of claim 17, wherein said configuration plug is in direct electrical connection between said load straps and said voltage sensors.

20. The circuit breaker in claim 17, wherein said first voltage sensor includes a transformer.

21. The circuit breaker in claim 17, wherein said first voltage sensor includes a voltage divider.

22. The circuit breaker in claim 21, wherein said voltage divider includes a first resistor in series with a second resistor.

23. A device for a multiphase circuit breaker comprising a detachable configuration plug operable to configure a plurality of circuit breaker voltage sensors with a plurality of circuit breaker load straps as a delta configuration or a wye configuration.

24. The sensor of claim 23, wherein said configuration plug has a switch to select said wye configuration or said delta configuration.

25. A multiphase circuit breaker comprising:
a plurality of load straps;
a plurality of voltage sensors disposed proximate to said load straps; and
a detachable configuration plug in electrical communication with said voltage sensors, said configuration plug operable to configure said voltage sensors with said load straps as a delta configuration or a wye configuration.

26. The sensor of claim 25, wherein said configuration plug has a switch to select said wye configuration or said delta configuration.

27. A multiphase circuit breaker, comprising:
a housing having a current path in one of the plurality of phases;
an electronic trip unit; and
a unitary shell having a first portion and a second portion, the unitary shell disposed within said housing proximate said current path;
wherein said first portion comprises a current sensor for sensing current at only the one phase, said current sensor in signal communication with said electronic trip unit;
wherein said second portion comprises a voltage sensor for sensing voltage at only the one phase, said voltage sensor in signal communication with said electronic trip unit; and
wherein said current sensor, said voltage sensor and said unitary shell are all disposed for signal communication with only the one phase of the multiphase circuit breaker.

28. The multiphase circuit breaker of claim 27, further comprising:
second and third current paths in a second and a third of the plurality of phases. respectively; and
second and third unitary shells each having first and second portions, and each disposed within said housing proximate said second and third current paths, respectively, wherein each of said first portion comprises a current sensor for sensing current at only the respective phase and being in signal communication with said electronic trip unit, and wherein each of said second portion comprises a voltage sensor for sensing voltage at only the respective phase and being in signal communication with said electronic trip unit;
wherein said second current sensor, said second voltage sensor and said second unitary shell are all disposed for signal communication with only the second phase of the multiphase circuit breaker; and
wherein said third current sensor, said third voltage sensor and said third unitary shell are all disposed for signal communication with only the third phase of the multiphase circuit breaker.

29. The multiphase circuit breaker of claim 28, further comprising:

a detachable configuration plug in signal communication with said first, second and third voltage sensors, said configuration plug operable to configure said first, second and third voltage sensors with said first, second and third current paths as a delta configuration, a wye configuration, or any combination comprising at least one of the foregoing configurations.

30. A multiphase circuit breaker having a plurality of phases, comprising:

a housing having a current path in each of the plurality of phases;

an electronic trip unit; and a sensor shell disposed within said housing proximate each of said current path in each of the plurality of phases;

wherein each sensor shell is made of a molded insulative material, and has a first cavity comprising a current sensor for sensing current at only one of the plurality of phases, said current sensor in signal communication with said electronic trip unit, and said second cavity comprising a voltage sensor for sensing voltage at only said one phase of the plurality of phases, said voltage sensor in signal communication with said electronic trip unit; and wherein each of said current sensor, said voltage sensor and said sensor shell are disposed for signal communication with only one phase of the plurality of phases of the multiphase circuit breaker.

\* \* \* \* \*